United States Patent [19]

Long et al.

[11] Patent Number: 4,528,214
[45] Date of Patent: Jul. 9, 1985

[54] POLYMERIC PRODUCT HAVING A FABRIC LAYER MEANS AND METHOD OF MAKING THE SAME

[75] Inventors: Delmar D. Long, Rock Hill, S.C.; James D. Hill, Jr., Turnback Township, Lawrence County, Mo.

[73] Assignee: Dayco Corporation, Dayton, Ohio

[21] Appl. No.: 598,107

[22] Filed: Apr. 9, 1984

Related U.S. Application Data

[62] Division of Ser. No. 486,650, Apr. 20, 1983.

[51] Int. Cl.³ .......................... B05C 3/107; B05D 3/02
[52] U.S. Cl. .................................... 427/173; 156/161; 427/175; 427/176; 427/389.9
[58] Field of Search ..................... 427/176, 389.9, 389, 427/392, 173, 175; 156/161, 165, 181, 296

[56] References Cited

U.S. PATENT DOCUMENTS

| | | | |
|---|---|---|---|
| 1,905,916 | 4/1933 | Leguillon | 427/173 |
| 2,707,318 | 5/1955 | O'Donnell | 427/176 |
| 3,784,428 | 1/1974 | Griffin | 156/139 |
| 3,784,441 | 1/1974 | Kaempen | 428/112 |
| 3,998,986 | 12/1976 | Williams | 428/102 |
| 4,062,989 | 12/1977 | Long | 427/176 |
| 4,238,530 | 12/1980 | Holloway et al. | 427/173 |
| 4,295,905 | 10/1981 | Bascom et al. | 156/181 X |
| 4,325,999 | 4/1982 | Campman et al. | 156/181 X |
| 4,406,724 | 9/1983 | Bostian, Jr. et al. | 156/161 |

FOREIGN PATENT DOCUMENTS

| | | | |
|---|---|---|---|
| 192863 | 11/1955 | Austria | 428/112 |
| 940246 | 3/1956 | Fed. Rep. of Germany | 428/112 |

*Primary Examiner*—Thurman K. Page
*Attorney, Agent, or Firm*—Joseph V. Tassone

[57] ABSTRACT

A polymeric product having a fabric layer and method of making the same are provided, the fabric layer being provided with opposed sides and at least one polymeric part secured to the fabric layer. The fabric layer comprises a first substantially planar layer of threads disposed in superimposed relation with a second substantially planar layer of threads whereby the threads of the first layer are not woven with the threads of the second layer, the polymeric part effectively being the sole securement that secures the threads of the first layer to the threads of the second layer and thereby imparting its flexible characteristic to the securement between the threads of the first and second layers.

21 Claims, 10 Drawing Figures

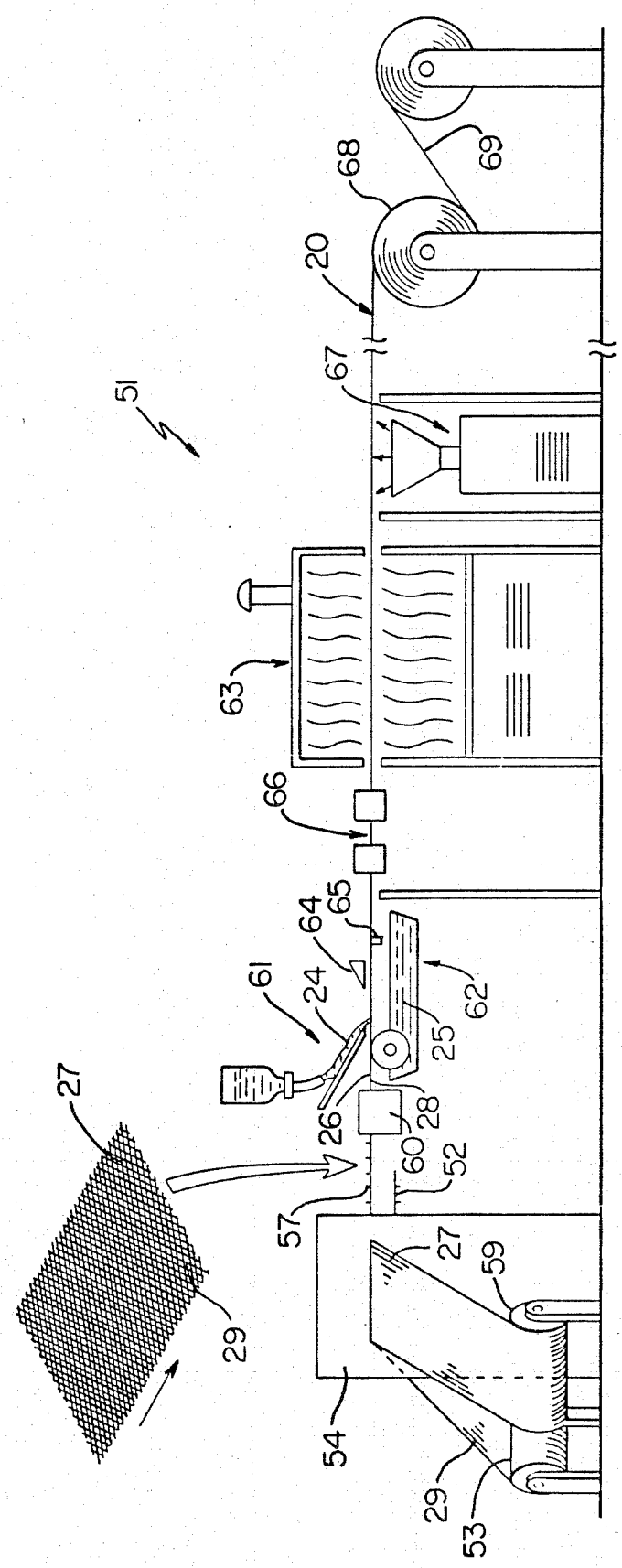

POLYMERIC PRODUCT HAVING A FABRIC LAYER MEANS AND METHOD OF MAKING THE SAME

This is a conpending division, of application Ser. No. 486,650, filed Apr. 20, 1983.

BACKGROUND OF THE INVENTION

1. Field of the Invention

This invention relates to an improved polymeric product having a fabric layer means and to a method of making such a polymeric product.

2. Prior Art Statement

It is known to provide a polymeric product having a fabric layer means provided with opposed sides and at least one polymeric means secured to the fabric layer means. For example, see the U.S. Pat. to Williams, U.S. Pat. No. 3,998,986; the U. S. Pat. to Long, No. 4,062,989; and the U. S. patent to Hollaway et al, No. 4,238,530.

SUMMARY OF THE INVENTION

It is one feature of this invention to provide an improved polymeric product having a fabric layer means and at least one polymeric means secured to the fabric layer means.

In particular, it is well known that a woven fabric structure that has been impregnated or coated with a polymeric means, such as a latex, has been used as an encapsulating or reinforcing member in endless transmission belts, such as a V-belt, and other products and has undergone a progression of change, principally directed toward the relationship of the warp fill angularity to the longitudinal axis of the belt, For example, initially, the warp or fill of the fabric was at right angles to the longitudinal axis; then the fabric was subsequently cut and turned on a 90° bias; then the fabric was subsequently cut and turned to a 120° bias and then today the fabric comprises a seamless bias disposed at 120°. Each such change in the polymeric coated fabric was primarily directed toward improving product flexibility. However, it was found according to the teachings of this invention that during such changes the three-dimensional aspect of the plain weave of the fabric had not been altered.

It is also well known in the art that improving structural flexibility or bending modulus of the polymeric coated fabric can be altered by decreasing yarn density (cover factor), decreasing twist of the yarn system, increasing the warp/fill angle, and/or decreasing the number of cross over points in the woven structure. Thus, it can be seen that the change in the base fabric structures has followed a need to optimize flexibility. And extension of this flexibility move in the art has been directed toward fabric manufacturing systems that emulate the desired bias and use yarn bundles or fiber bundles that are not interlaced as in a woven structure, but are being held together in the third dimension by either a stitching thread of fiber reinorientation, such as by needle punching. However, the result of this change has been opposite to the objective, as flexibility was reduced.

However, it was found according to the teachings of this invention that a fabric means can be provided wherein the bias orientation is maintained while the third dimension function is eliminated and this is accomplished by utilizing polymeric means as the effective sole securement means between the threads of the fabric means so as to impart its flexibility characteristic to the securement means of the fabric means whereby the resulting product has the desired structural flexibility or bending modulus.

For example, one embodiment of this invention provides a polymeric product having a fabric layer means provided with opposed sides and at least one polymeric means secured to the fabric layer means. The fabric layer means comprises a first substantially planar layer of thread means disposed in superimposed relation with a second substantially planar layer of thread means whereby the thread means of the first layer are not woven with the thread means of the second layer, the polymeric means effectively being the sole securement means securing the thread means of the first layer to the thread means of the second layer and thereby imparting its flexible characteristic to the securement means between the thread means of the first and second layers.

Accordingly, it is an object of this invention to provide an improved polymeric product having a fabric layer means provided with at least one polymeric means secured to the fabric layer means, the product of this invention having one or more of the novel features of this invention as set forth above or hereinafter shown or described.

Another object of this invention is to provide an improved method of making such a product, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 6 is an enlarged schematic side view of the method and apparatus of FIG. 5.

FIG. 7 is a schematic view illustrating a certain portion of the method and apparatus of FIGS. 5 and 6.

FIG. 8 is an enlarged, schematic, fragmentary cross-sectional view taken on line 8—8 of FIG. 7.

FIG. 9 is a view similar to FIG. 8 and illustrates another embodiment of this invention.

FIG. 10 is a view similar to FIG. 8 and illustrates another embodiment of this invention.

DESCRIPTION OF THE PREFERRED EMBODIMENTS

Figure 1:
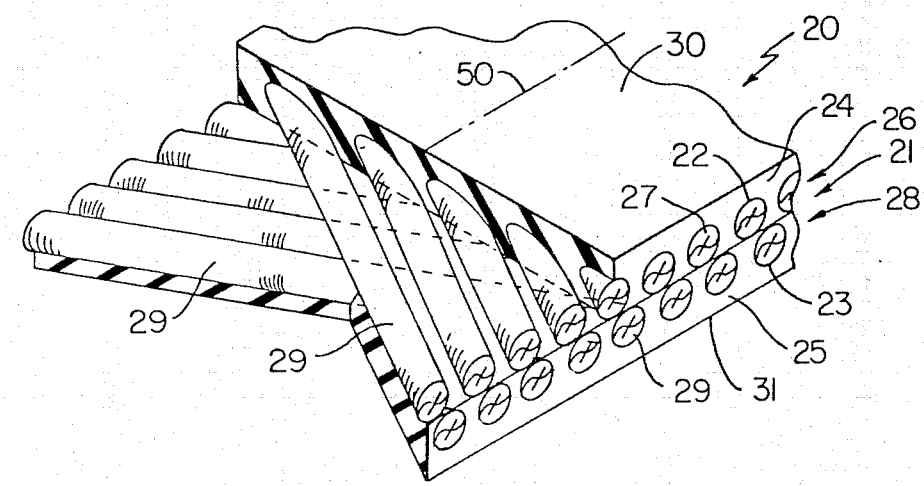
FIG. 1 is an enlarged, fragmentary, partially broken away, cross-sectional, schematic, perspective view of an improved polymeric product of this invention.

While the various features of this invention are hereinafter illustrated and described as being particularly adapted to provide a polymeric coated fabric layer means for making particular products, it is to be understood that the various features of this invention can be utilized singly or in various combinations thereof to provide a polymeric product for other uses and/or for other products as desired.

Therefore, this invention is not to be limited to only the embodiments illustrated in the drawings, because the drawings are merely utilized to illustrate some of the wide variety of uses of this invention.

Referring now to FIG. 1, one embodiment of the improved polymeric product of this invention is generally indicated by the reference numeral 20 and comprises a polymeric coated fabric layer means having a fabric layer means that is generally indicated by the reference numeral 21 and provided with opposed sides 22 and 23, the polymeric product 20 also comprising two polymeric layers or means 24 and 25 respectively disposed on the opposite sides 22 and 23 of the fabric layer means 21 and having been exuded into the fabric layer means 21 to be secured thereto in a manner hereinafter set forth.

The fabric layer means 21 of this invention comprises a first substantially planar layer 26 of thread means 27 disposed in superimposed relation with a second substantially planar layer 28 of thread means 29 whereby the thread means 27 of the first layer 26 are not woven with the thread means 29 of the second layer 28 but are secured thereto by the polymeric means 24, 25 in such a manner that the polymeric means 24, 25 effectively comprises the sole securement means securing the thread means 27 of the first layer 26 to the thread means 29 of the second layer 28 and thereby imparts its flexible characteristic to the securement means between the thread means 27 and 29 of the first and second layers 26 and 28.

In this manner, it is believed that the resulting polymeric coated fabric layer means or polymeric product 20 of this invention will have an improved structural flexibility or bending modulus than if the fabric layer means 21 had comprised a conventional woven fabric layer means such as set forth in the aforementioned U.S. Pat. Nos. 4,062,989 and 4,238,530 or had comprised stitched or needled structure as set forth in the aforementioned U.S. Pat. No. 3,998,986 whereby these three U.S. patents are being incorporated into this disclosure by this reference thereto.

In particular, it is believed that the polymeric coated layer means 20 of this invention can be readily utilized by itself or with another polymeric product by having one of the opposed outer surfaces 30 and 31 thereof secured to a surface of the polymeric product for the same purpose and in a manner similar to other prior known polymeric coated fabric layer means.

For example, see the copending patent application of Delmar D. Long, one of the coinventors of this invention, Ser. No. 350,969, filed Feb. 22, 1982, wherein an additional tacky layer is provided on the polymeric coated fabric layer means for such securement purposes. Since this copending patent application describes the various uses of polymeric coated fabric layer means and a method and apparatus for making the same, which is similar to this invention as will be apparent hereinafter, this copending patent application is being incorporated into this disclosure by this reference thereto.

Figure 2:
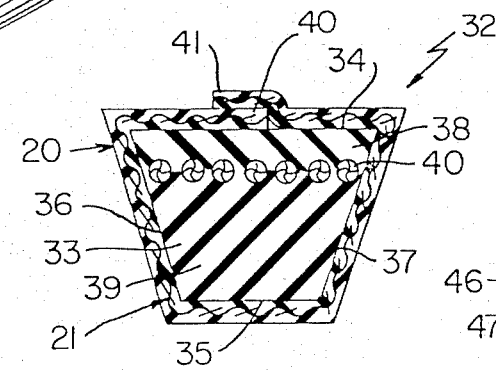
FIG. 2 is a cross-sectional view of an endless transmission belt construction utilizing the polymeric product of FIG. 1.

Reference is now made to FIG. 2 wherein another polymeric product of this invention is generally indicated by the reference numeral 32 and utilizes the previously described polymeric product 20, the polymeric product 32 comprising an endless power transmission belt of a typical "V" type wherein a polymeric body 33 thereof has a substantially trapezoidal cross-sectional configuration defined by a pair of opposed flat parallel top and bottom surfaces 34 and 35 with a pair of angled side surfaces 36 and 37 disposed therebetween. The belt construction 32 has the conventional tension section 38, compression section 39 and load carrying section 40 disposed intermediate the tension section 38 and the compression section 39 in a manner well known in the art, the sections 38, 39 and 40 being made mainly of polymeric material.

As is conventional in the art, the opposed angular surfaces 36 and 37 of the belt body 33 are each adapted to have a friction layer, that comprises a fabric impregnated with a polymeric composition, secured thereon by such friction layer either being disposed only on the surfaces 36 and 37 thereof or by having the entire outside surface of the belt body 33 wrapped with the friction layer.

In any event, it can be seen that the belt construction 32 illustrated in FIG. 2 has the belt body 33 thereof completely wrapped by a strip of a polymeric coated fabric layer means 20 of this invention so that the opposed ends 40 and 41 of the layer means 20 are disposed and secured in overlapping relation, such as on the top surface 34 of the belt body 33 as illustrated in FIG. 2 and as is conventional in the belt making art.

When utilizing the layer means 20 of this invention for forming the belt construction 32 of FIG. 2, it can be seen that either the side 30 or the side 31 thereof can be disposed in contact with the outer surfaces 34, 35, and 36 and 37 of the polymeric body 33 and it is believed that the improved flexible characteristic of the polymeric product 20 will permit the polymeric product 20 to more readily conform to such surfaces 34, 35, 36 and 37 so that during a subsequent heat curing or vulcanizing of the belt construction 32, after the layer means 20 has been wrapped on the belt body 33 in a manner well known in the art of making belt constructions, the polymeric product 20 will be secured to the belt body 33 throughout its entire outer surface area.

Also, it is to be understood that the particular side 30 or 31 of the polymeric coated fabric layer means 20 of this invention that is to be secured to the sides 34, 35, 36 and 37 of the belt body 33 could be covered with an additional tacky layer of the aforementioned copending patent application, Ser. No. 350,969, filed Feb. 22, 1982 to enhance the securement therebetween.

In any event, it can be seen that the outer surface 30 or 31 of the layer means 20 of this invention provides the contact facing of the belt construction 32 at the driving or driven insides 36 and 37 thereof as is conventional in the art while the fabric layer means 21 provides the desired reinforcing characteristic to the belt construction 32 while at the same time provides an improved flexibility thereto because of the effective flexible securement between the thread means 27 and 29 of the first and second layers 26 and 28.

While the polymeric coated fabric layer means 20 of this invention has been previously described as forming an outside surface of a belt product, it is to be understood that the layer means 20 of this invention can provide not only an outside surface thereof but also in addition thereto or in lieu thereof can form part of an inner layer of the belt product if desired. For example, reference is now made to FIG. 3 wherein another polymeric belt body or product 42 of this invention is provided and comprises a pair of polymeric layers 43 and 44 respectively having facing sides 45 and 46 being secured to each other by a strip 47 of the layer means 20 of this invention that is disposed intermediate the polymeric layers 43 and 44 and being secured thereto during a subsequent heating curing or vulcanizing of the belt body 43 in a manner well known in the art of making belt constructions.

Also, while the polymeric coated fabric layer means 20 of this invention has previously been described as forming a part or parts of a belt construction or the like, it is to be understood that there are other products that can utilize the layer means 20 of this invention by itself or as a part thereof.

Figure 4:
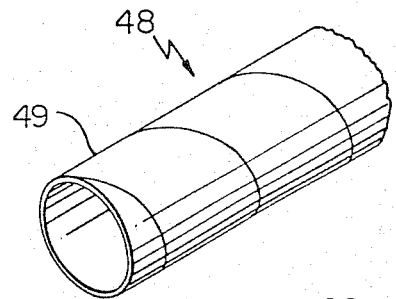
FIG. 4 is a fragmentary perspective view illustrating another product of this invention utilizing the polymeric product of FIG. 1.

For example, the layer means 20 of this invention can provide a hose construction that is generally indicated by the reference numeral 48 in FIG. 4 by having an elongated strip 49 of the layer means 20 of this invention helically wrapped and secured in overlapping relation in a manner well known in the hose construction art to provide the hose construction 48 together with or without additional wire reinforcing means as desired.

Further, it is to be understood that the polymeric coated fabric layer means 20 of this invention can provide part of a printing blanket, gasket means, etc. whereby it can be seen that the layer means 20 of this invention can be utilized as a product itself or with other products not disclosed in this application because it is believed that the same is readily adapted to be utilized where any such polymeric coated fabric layer means is presently being used or where such a polymeric coated fabric layer means could possibly be used.

The first layer 26 of thread means 27 of the polymeric coated fabric layer means 20 comprises a plurality of threads, strands, yarns or the like disposed generally parallel to each other with any desired pattern of spaces or non-spaces therebetween and being disposed at an angle relative to the longitudinal axis of the layer means 20, such as being at an acute angle to the longitudinal axis 50 as illustrated in FIG. 1.

Similarly, the second layer 28 of thread means 29 of the polymeric coated fabric means comprises a plurality of threads, strands, yarns or the like disposed generally parallel to each other with any desired pattern of spaces or non-spaces therebetween and being disposed at an obtuse angle relative to the longitudinal axis 50 of the layer means 20 so as to cross with the thread means 27 of the first layer 26 at some angle, such as between 90° to 120°. However, it is of course to be understood that any desired angle between the thread means 27 and 29 of the layers 26 and 28 can be provided, as desired.

Further, it is to be understood that the thread means 27 and 29 of the layer means 26 and 28 could comprise any one suitable material or be blends of suitable materials with the thread means 27 and 29 being uniform, dissimilar or any desired combination thereof as desired.

Also, the polymeric means 24, 25 can comprise any suitable polymeric material, such as a latex, with the material of the layers 24 and 25 being like, similar or different, as desired.

Figure 3:
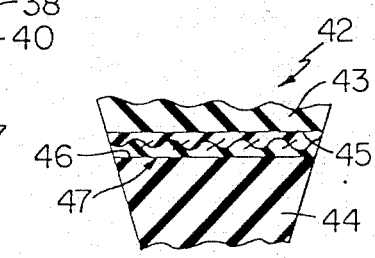
FIG. 3 is a fragmentary view similar to FIG. 2 and illustrates anothe type of belt utilizing the polymeric product of FIG. 1.

In any event, as previously stated, the polymeric means 24, 25 provides the sole securement between the thread means 27 and 29 of the layers 26 and 28 so as to add its flexible characteristic to such securement means so that the layer means 20 will readily conform to the particular shape in the final product thereof, whether the same is formed into the hose 48 of FIG. 4, the belt configurations of FIGS. 2 or 3 or other products as desired as well as add its flexibility to the final product together with the reinforcing characteristic of the fabric means 21 thereof.

While it is believed that the polymeric coated fabric layer means 20 of this invention can be made by any suitable method and apparatus, one such method and apparatus is generally indicated by the reference numeral 51 in FIGS. 5, 6 and 7 and will now be described.

Figure 5:
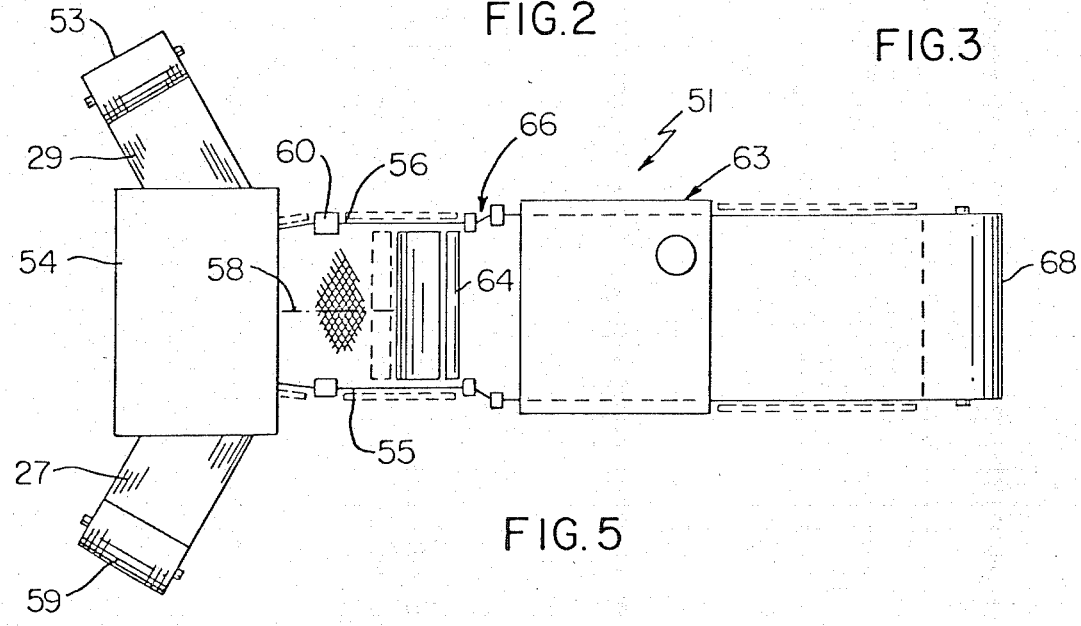
FIG. 5 is a schematic top view of an improved method and apparatus of this invention for making the polymeric product of FIG. 1.

As illustrated in FIGS. 5 and 6, the method and apparatus 51 includes a tenter frame 52, similar to the tenter frames of the aforementioned U.S. patents and application, that is adapted to be moved in any suitable manner from left to right in FIGS. 5 and 6 and have the two layers 26 and 28 of thread means 27 and 29 laid thereon at the desired angle so as to be disposed in the stacked relation illustrated in FIG. 1.

For example, the thread means 29 for the layer means 28 can be fed in beam fashion from a supply 53 thereof into an area 54 wherein the same are cut and laid across the tenter frame 52 from one side 55 thereof to the other side 56 thereof and held thereon by the conventional tenter pins 57 so that each thread means 29 extends from one side 55 of the tenter frame 52 to the other side 56 thereof at the desired angle relative to the longitudinal axis 58 of the tenter frame 52.

Similarly, another beam of the thread means 27 can be fed from a supply 59 thereof into the area 54 so as to have the thread means 27 thereof cut and laid across the tenter frame 52 on top of the thread means 29 at an angle relative thereto so that each thread means 27 extends from the side 55 of the tenter frame 52 to the side 56 thereof at the desired angle relative to the longitudinal axis 58 of the tenter frame 52.

It is to be understood that the thread means 27 and 29 can be cut and laid on the tenter frame 52 in either a continuous or intermittent manner as the superimposed layers 26 and 28 can then be indexed in a continuous or intermittent manner from left to right through the remaining portion of the apparatus 51 to have the polymeric means 24 and 25 applied thereto in much the same manner as provided by the methods and apparatus set forth in the aforementioned U.S. patents and copending patent application.

In particular, after the layers 26 and 28 have been disposed in the superimposed relation on the tenter frame 52 to define the fabric layer means 21, the tenter frame 52 can be slightly outwardly stretched in the area of the reference numeral 60 in FIGS. 5 and 6 to make sure that the threads 27 and 29 are disposed in a taut relation as the same pass between suitable coating means 61 and 62 that are respectively disposed on opposite sides of the tenter frame 52 to respectively apply the polymeric coatings 24 and 25 in a liquid manner to the respective sides 22 and 23 of the fabric layer means 21 so that the coatings 24 and 25 will not only be secured to those sides 22 and 23 but also so that the coatings 24 and 25 will exude into the fabric layer means 21 to secure the thread means 27 and 29 thereof together when the coatings 24 and 25 are subsequently dried by the drying apparatus that is generally indicated by the reference numeral 63 in FIGS. 5 and 6.

However, before the now coated fabric means 21 passes into the heating means 63, the coatings 24 and 25 are respectively doctored by suitable doctor means 64 and 65 to define the relatively smooth outer surfaces 30 and 31 and then the tenter frame 52 further stretches the polymeric coated fabric means 20 in the area of the reference numeral 66 in FIGS. 5 and 6 to make sure that the layer means 20 is held with its thread means 27 and 29 in a taut manner as the coatings 24 and 25 are subsequently dried to at least a holding condition thereof by the heating means 63.

While the heating means 63 can comprise any suitable structure, the same comprises a heated air oven-like member through which the layer means 20 passes from left to right so that by the time the layer means 20 exits the heating means 63, the coatings 24 and 25 have been sufficiently dried so that the same will hold the thread means 27 and 29 in their assembled and encapsulated manner.

If desired, suitable cooling means 67 can be provided to cool the layer means 20 before the same is wound into a supply roll 68 thereof, the supply roll 68 having a web 69 of material wound with the layer means 20 intermediate the coils thereof so as to prevent sticking of the coils of the layer means 20 in the supply roll 69 thereof if desired as is well known in the art.

Therefore, it can be seen that it is a relatively simple method of this invention to form the polymeric coated fabric layer means or product 20 in the manner previously set forth.

However, while the method and apparatus 51 of this invention has been previously described as having the thread means 27 disposed on top of the thread means 29 in the area 54 without providing any securement therebetween so that stacked thread means 27 and 29 have the appearance illustrated schematically in FIG. 8 at the time the liquid coatings 24 and 25 are to be applied thereto, it is to be understood that one or both layers 26 and 28 of the thread means 27 and 29 could be precoated, either on just the contacting sides thereof or completely around the same, with a liquid polymeric material, such as latex, before the same are disposed in superimposed relation on the tenter frame 52.

For example, it can be seen schematically in FIG. 7 that coating means 70 and 71 can be respectively provided for the thread means 27 and 29 to apply a polymeric coating 72 to only the sides 73 and 74 of the thread means 27 and 29 which will be disposed facing each other in the manner illustrated in FIG. 9 so that the polymeric means 72 will provide sufficient adhesive means to hold the thread means 27 and 29 together as the same pass through the coating means 61 and 62 in the apparatus 51. In this manner, the coatings 24 and 25 together with the coating 72 form the polymeric means that secures the thread means 27 and 29 together in the final product thereof.

However, it is to be understood that the layer means or polymeric product 20 of this invention could have a cross-sectional configuration that looks like the structure illustrated in FIG. 9 without having the additional coatings 24 and 25 applied thereto as the polymeric means 72 will still provide the effective sole securement means for securing the layers 26 and 28 of thread means 27 and 29 together.

Alternately, the polymeric applying means 70 and 71 can be so constructed and arranged that the same will completely coat the thread means 27 and 29 with a polymeric material 75 as illustrated in FIG. 10 so that when the thread means 27 and 29 are disposed in superimposed relation on the tenter frame 52, the resulting structure will have the appearance as illustrated in FIG. 10 so that the coatings 24 and 25 can be subsequently applied thereto by the coating means 61 and 62 if desired. In this manner, the coatings 24 and 25 together with the coatings 75 form the polymeric means that secures the thread means 27 and 29 together in the final product thereof.

However, as previously stated, the coatings 24 and 25 need not be provided for forming the layer means or polymeric product 20 of this invention as the polymeric material 75 will provide the only polymeric material thereof and will provide the effective sole securement means for securing the thread means 27 and 29 together in the manner previously set forth and as illustrated in FIG. 10.

Also, it is to be understood that only one coating 24 or 25 need be provided for making the product 20 of this invention as the same will sufficiently exude into the fabric means 21 to secure the thread means 27 and 29 together if the precoatings 72 or 75 are not also utilized.

Therefore, it can be seen that there are various methods and apparatus that can be utilized to make the layer means 20 of this invention having the unique features previously set forth.

Thus, it can be seen that it is a relatively simple method of this invention to provide the polymeric coated fabric layer means or polymeric product 20 of this invention that comprises a fabric layer means 21 provided with opposed sides 22 and 23 and at least one polymeric means 72, 75, 24 and/or 25 secured to the fabric layer means 21, the fabric layer means 21 comprising a first substantially planar layer 26 of thread means 27 disposed in superimposed relation with a second substantially planar layer 28 of thread means 29 whereby the thread means 27 of the first layer 26 are not woven with the thread means 29 of the second layer 28. The polymeric means 72, 75, 24 and/or 25 effectively is the sole securement means securing the thread means 27 of the first layer 26 to the thread means 29 of the second layer 28 and thereby imparting its flexible characteristic to the securement means between the thread means 27 and 29 of the first and second layers 26 and 28.

While the product means 20 of this invention has been previously described as having the thread means 27 and 29 separated from each other before the polymeric material is added thereto, it is to be understood that the thread means 27 and 29 could initially be stitched in stacked relation with a sewing thread that will dissolve after the polymeric material is added thereto so that the subsequently added polymeric material still provides the effective sole securement means. Also, it is to be understood that the thread means 27 and 29 could be laid in place, such as on a polymeric belt section and then another polymeric belt section added on top of the same, so that a subsequent heat curing operation will cause at least one of the belt sections to exude into the thread means 27 and 29 to provide the effective sole securement means therefor without having the thread means 27 and 29 initially secured together with the polymeric means.

As previously stated, the thread means 27 and 29 and polymeric means 24, 25, 72 and 75 can comprise any suitable material or combination thereof. However, it is to be understood that any of the means 27, 29, 24, 25, 72 and 75 can be of the particular type or types set forth in the aforementioned U.S. patents and/or patent application that have been incorporated into this application by the previous reference thereto. Also, while the heating means 63 has been described as drying the coatings 24, 25, 72 and/or 75 to a condition that will hold the thread means 27 and 29 in secured together relation, such heating means can provide such dried condition without curing of the coatings 24, 25, 72 and/or 75 as in the aforementioned U.S. patents and/or patent application so that such coatings can subsequently be cured, such as during the formation of the final desired product as previously described. However, it is to be understood that the heating means 63 can cure the coatings 24, 25, 72 and/or 75, if desired as the final product may be such cured layer means 20.

Accordingly, it can be seen that this invention not only provides an improved polymeric product, but also this invention provides an improved method of making such a polymeric product.

While the forms and methods of this invention now preferred have been illustrated and described as required by the Patent Statute, it is to be understood that other forms and method steps can be utilized and still fall within the scope of the appended claims.

What is claimed is:

1. In a method of making a polymeric product having a fabric layer means provided with opposed sides and at least one polymeric means secured to said fabric layer means, said fabric layer means having been stretched in a generally transverse direction relative to the longitudinal axis of said fabric layer means, the improvement comprising the steps of forming said fabric layer means to comprise a first substantially planar layer of thread means and a second substantially planar layer of thread means with each layer of thread means comprising a plurality of strand means disposed in a non-interconnected generally straight line side-by-side parallel relation and with said first layer of thread means having said polymeric means applied thereto in liquid form and being disposed in superimposed relation against said second layer of thread means in such a manner that at least a part of said applied polymeric means in liquid form is disposed against said thread means of said second layer whereby said thread means of said first layer are not woven with said thread means of said second layer, said step of forming said fabric layer means also comprising the steps of disposing said strand means of said first layer to cross said axis at an acute angle relative thereto and disposing said strand means of said second layer to cross said axis at an obtuse angle relative thereto whereby said strand means of said second layer are disposed at an angle relative to said strand means of said first layer, and thereafter, forming said polymeric means to effectively be the sole securement means securing said thread means of said first layer to said thread means of said second layer and thereby impart its flexible characteristic to said securement means between said thread means of said first and second layers by first substantially simultaneously stretching said superimposed layers in said transverse direction and then drying said applied polymeric means to at least a condition thereof that tends to hold said strand means of said layers in said generally side-by-side parallel relation and said layers in said superimposed relation.

2. A method of making a polymeric product as set forth in claim 1 wherein said first and second layers of thread means are disposed in said superimposed relation on a tenter frame.

3. A method of making a polymeric product as set forth in claim 1 and including the step of also applying polymeric means in liquid form to said second layer of thread means before said layers are disposed in said superimposed relation so that said polymeric means on said second layer of thread means forms part of said applied polymeric means that is subsequently dried to said condition that tends to hold said strand means of said layers in said generally side-by-side parallel relation and said layers in said superimposed relation.

4. A method of making a polymeric product as set forth in claim 3 wherein said dried polymeric means is disposed only intermediate the outer sides of said layers of thread means.

5. A method of making a polymeric product as set forth in claim 3 wherein said dried polymeric means is not only disposed on the facing sides of said layers of thread means but also is disposed on the outer sides thereof.

6. A method of making a polymeric product as set forth in claim 1 wherein said product comprises an endless power transmission belt.

7. A method of making a polymeric product as set forth in claim 1 wherein said product comprises a sheet-like strip of said fabric layer means and said polymeric means.

8. In a method of making a polymeric product having a fabric layer means provided with opposed sides and at least one polymeric means secured to said fabric layer means, said fabric layer means having been stretched in a generally transverse direction relative to the longitudinal axis of said fabric layer means, the improvement comprising the steps of forming said fabric layer means to comprise a first substantially planar layer of thread means and a second substantially planar layer of thread means with each layer of thread means comprising a plurality of strand means disposed in a non-interconnected generally straight line side-by-side parallel relation and with said first layer of thread means having part of said polymeric means applied thereto in liquid form and being disposed in superimposed relation against said second layer of thread means in such a manner that at least a part of said applied polymeric means in liquid form is disposed against said thread means of said second layer whereby said thread means of said first layer are not woven with said thread means of said second layer, said step of forming said fabric layer means also comprising the steps of disposing said strand means of said first layer to cross said axis at an acute angle relative thereto and disposing said strand means of said second layer to cross said axis at an obtuse angle relation thereto whereby said strand means of said second layer are disposed at an angle relative to said strand means of said first layer, and, thereafter, forming said polymeric means to effectively be the sole securement means securing said thread means of said first layer to said thread means of said second layer and thereby impart its flexible characteristic to said securement means between said thread means of said first and second layers by first substantially simultaneously stretching said superimposed layers in said transverse direction and then disposing additional polymeric means in liquid form against at least one side of said stretched superimposed layers so as to exude into said superimposed layers and then by drying said disposed and exuded and applied polymeric means to at least a condition thereof that tends to hold said strand means of said layers in said generally side-by-side parallel relation and said layers in said superimposed relation.

9. A method of making a polymeric product as set forth in claim 8 wherein said first and second layers of thread means are disposed in said superimposed relation on a tenter frame and said additional polymeric means is disposed in liquid form against said superimposed layers while said superimposed layers are on said tenter frame.

10. A method of making a polymeric product as set forth in claim 8 and including the step of forming said additional polymeric means to comprise a layer of polymeric material disposed on one of said sides of said fabric layer means and exuding into said fabric layer means to define at least part of said sole securement means thereof.

11. A method of making a polymeric product as set forth in claim 10 and including the step of forming said additional polymeric means to comprise another layer of polymeric material disposed on the other of said sides of said fabric layer means and exuding into said fabric layer means to define at least another part of said sole securement means thereof.

12. A method of making a polymeric product as set forth in claim 8 and including the step of also applying polymeric means in liquid form to said second layer of thread means before said layers are disposed in said superimposed relation so that said polymeric means on said second layer of thread means forms part of said applied polymeric means that is subsequently dried to said condition that tends to hold said strand means of said layers in said generally side-by-side parallel relation and said layers in said superimposed relation.

13. A method of making a polymeric product as set forth in claim 8 wherein said product comprises an endless power transmission belt.

14. A method of making a polymeric product as set forth in claim 8 wherein said product comprises a sheet-like strip of said fabric layer means and said polymeric means.

15. In a method of making a polymeric product having a fabric layer means provided with opposed sides and at least one polymeric means secured to said fabric layer means, said fabric layer means having been stretched in a generally transverse direction relative to the longitudinal axis of said fabric layer means before said polymeric means is secured thereto, the improvement comprising the steps of forming said fabric layer means to comprise a first substantially planar layer of thread means and a second substantially planar layer of thread means with each layer of thread means comprising a plurality of strand means disposed in a non-interconnected generally straight line side-by-side parallel relation and with said first layer of thread means disposed in superimposed relation against said second layer of thread means whereby said thread means of said first layer are not woven with said thread means of said second layer, said step of forming said fabric layer means also comprising the steps of disposing said strand means of said first layer to cross said axis at an acute angle relative thereto and disposing said strand means of said second layer to cross said axis at an obtuse angle relative thereto whereby said strand means of said second layer are disposed at an angle relative to said strand means of said first layer, and thereafter, forming said polymeric means to effectively be the sole securement means securing said thread means of said first layer to said thread means of said second layer and thereby impart its flexible characteristic to said securement means between said thread means of said first and second layers by first substantially simultaneously stretching said superimposed layers in said transverse direction and then disposing said polymeric means in liquid form against at least one side of said stretched superimposed layers so as to exude into said superimposed layers and then by drying said disposed and exuded polymeric means to at least a condition thereof that tends to hold said strand means of said layers in said generally side-by-side parallel relation.

16. A method of making a polymeric product as set forth in claim 15 wherein said first and second layers of thread means are disposed in said superimposed relation on a tenter frame and said polymeric means is disposed in liquid form against said superimposed layers while said superimposed layers are on said tenter frame.

17. A method of making a polymeric product as set forth in claim 15 and including the step of forming said polymeric means to initially comprise a single layer of liquid polymeric material disposed on said one side of said superimposed layers and exuding into and through said superimposed layers to the other side thereof so that both sides of said superimposed layers have said polymeric means thereon.

18. A method of making a polymeric product as set forth in claim 15 and including the step of forming said polymeric means to initially comprise two layers of liquid polymeric material respectively disposed on the opposed sides of said superimposed layers and exuding into the same so that both sides of said superimposed layers have said polymeric means thereon.

19. A method of making a polymeric product as set forth in claim 15 and including the step of thereafter disposing additional polymeric means on at least one side of the thus dried polymeric means.

20. A method of making a polymeric product as set forth in claim 15 wherein said product comprises an endless power transmission belt.

21. A method of making a polymeric product as set sorth in claim 15 wherein said product comprises a sheet-like strip of said fabric layer means and said polymeric means.

* * * * *